D. D. GETMAN AND J. P. STERNHAGEN.
FLAT TIRE SIGNAL.
APPLICATION FILED MAR. 6, 1917. RENEWED DEC. 6, 1919.

1,346,599.

Patented July 13, 1920.

WITNESSES:
B. Hall
E. A. Paul

INVENTORS:
DAVID D. GETMAN,
JOSEPH P. STERNHAGEN
BY
Paul & Paul
ATTORNEYS.

UNITED STATES PATENT OFFICE.

DAVID D. GETMAN, OF MINNEAPOLIS, MINNESOTA, AND JOSEPH P. STERNHAGEN, OF GLASGOW, MONTANA; SAID GETMAN ASSIGNOR TO SAID STERNHAGEN.

FLAT-TIRE SIGNAL.

1,346,599.   Specification of Letters Patent.   Patented July 13, 1920.

Application filed March 6, 1917, Serial No. 152,473. Renewed December 6, 1919. Serial No. 343,109.

*To all whom it may concern:*

Be it known that we, DAVID D. GETMAN and JOSEPH P. STERNHAGEN, citizens of the United States, and residents, respectively, of Minneapolis, county of Hennepin, and State of Minnesota, and Glasgow, county of Valley, State of Montana, have invented certain new and useful Improvements in Flat-Tire Signals, of which the following is a specification.

The object of our invention is to provide means whereby an audible signal will be given in case of puncture of the tire to warn the driver that it needs attention and thereby prevent damage to the casing and inner tube, which will result from the running of the wheel on a flat tire.

The invention consists generally in various constructions and combinations, all as hereinafter described and particularly pointed out in the claims.

In the accompanying drawings forming part of this specification,

Figure 1:
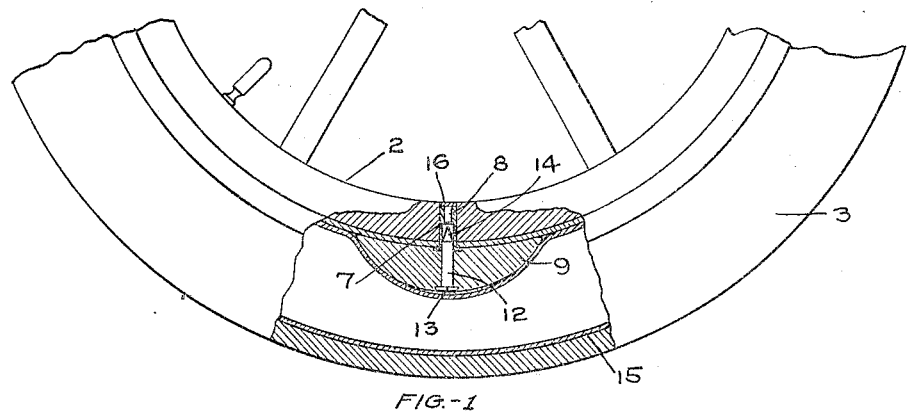
Figure 1 is a side view, partially in section, of a portion of a vehicle wheel with our invention applied thereto.
Figure 2:
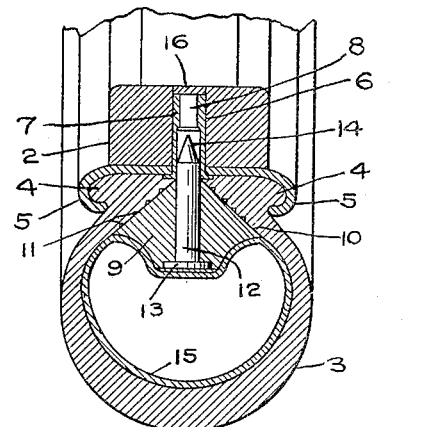
Fig. 2 is a transverse sectional view through the rim and tire of the wheel, showing our invention in place, ready for use.
Figure 3:
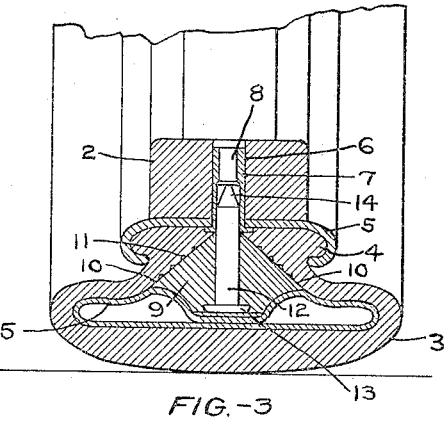
Fig. 3 is a similar view, showing the position assumed by the signal when the tire is flat after the puncture.
Figure 4:
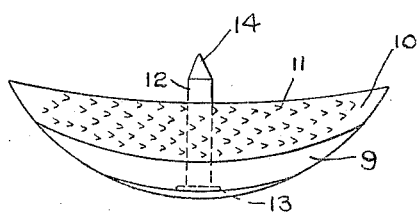
Fig. 4 is a detail view of the signal device removed from the casing.

In the drawing, 2 represents the rim of a vehicle wheel, 3 the outer casing having the usual flanges or lips 4 for engaging the edges 5 of the rim in the usual way. The rim has a socket 6 therein into which a sleeve 7 is inserted, and in this sleeve a blank cartridge 8 is mounted, having the usual fulminating cap in the outer end. 9 is a block of suitable yielding material, such as rubber, having surfaces 10 which fit against the inner walls of the casing and are preferably provided with points or projections 11 which bear on these walls or dig into the surfaces thereof to prevent the block from slipping out of place. In this block a pin 12 is mounted, having preferably a head 13 at its outer end and a tapered point 14 at its inner end that is slidable in the sleeve 7, the top of the tapered end being in position to contact with the cap in the cartridge and explode the same when the pin 12 is thrust inwardly by pressure on the head thereof. The inner tube 15, when inflated, bears against the walls of the block and aids in holding it in position within the casing, and when a puncture occurs and the wheel is allowed to drop down upon a flat tire, as indicated in Fig. 3, the shock of contact of the pin with the tread of the casing will cause the block 9 to yield sufficiently and allow the tapered end of the pin to strike the cap and explode the cartridge, and thereupon the driver will be warned that a tire has punctured and is running flat.

The block, while composed of yielding material, is sufficiently rigid to obstruct the free revolution of the wheel when the tire is deflated and cause a bumping or jarring of the vehicle which would immediately call the driver's attention to the tire if he failed to hear the audible signal or if for any reason it did not operate when the air escaped from the tire.

The inner end of the socket 6 is preferably closed by a disk 16 which normally conceals the cartridge and is blown out when the cartridge is exploded. Upon removing the casing to repair the tube, the pin 12 may be withdrawn and a fresh cartridge inserted into the socket in the sleeve so that when the block is replaced and the tube again inflated, the device will be ready for use again.

We do not wish to be confined to the shape or size of the yielding block, nor to the material of which it is composed, as in various ways these details of construction may be modified and still be within the scope of our invention.

We claim as our invention:

1. In combination, with a pneumatic tire, of a block interposed between the inner wall of the tire tube and the casing and having a convex surface for contact with the tube wall and provided with a comparatively broad bearing thereon to protect said tube from injury, said block being sufficiently rigid to obstruct the turning of the wheel and produce a jarring or bumping effect when the tire is deflated, a signal device comprising a cartridge mounted in the wheel rim, and means actuated through the pressure of the load on said block when the tire is deflated for exploding said cartridge.

2. The combination, with a pneumatic tire, of a block of yielding material fitting between the flanges of the outer casing and seated on the inner tube, a plunger member mounted in said block and having its outer end positioned for receiving the shock or impact of the tread of the casing when the inner tube is deflated, and an audible signal device actuated through the movement of said plunger.

3. The combination, with a pneumatic tire comprising a shoe and inner tube, of a block interposed between the tube and the flanges or lips of the shoe and adapted to force a portion of the inner wall of said tube toward the outer wall thereof and form an obstruction or bump in the passage within the tube, said block being non-yielding substantially to obstruct the turning of the wheel and produce a jarring or bumping effect when the tube is deflated as by puncture, a signal device mounted in the wheel rim and means actuated through the pressure of the load on said block when the air in the tube is released for operating said signal device.

In witness whereof we have hereunto set our hands this 1st day of March 1917.

DAVID D. GETMAN.
JOSEPH P. STERNHAGEN.